(12) United States Patent
Yu

(10) Patent No.: US 10,171,530 B2
(45) Date of Patent: Jan. 1, 2019

(54) DEVICES AND METHODS FOR TRANSMITTING ADAPTIVELY ADJUSTED DOCUMENTS

(71) Applicants: Hisense USA Corp., Suwanee, GA (US); Hisense Electric Co., Ltd., Qingdao, Shandong (CN); Hisense International Co., Ltd., Qingdao, Shandong (CN)

(72) Inventor: Ke Yu, Alpharetta, GA (US)

(73) Assignees: Hisense USA Corp., Suwanee, GA (US); Hisense Electric Co., Ltd., Shandong (CN); Hisense International Co., Ltd., Shandong (CN)

( * ) Notice: Subject to any disclaimer, the term of this patent is extended or adjusted under 35 U.S.C. 154(b) by 463 days.

(21) Appl. No.: 14/742,010

(22) Filed: Jun. 17, 2015

(65) Prior Publication Data

US 2016/0164938 A1 Jun. 9, 2016

Related U.S. Application Data

(63) Continuation-in-part of application No. 14/562,280, filed on Dec. 5, 2014, now Pat. No. 9,912,984.

(51) Int. Cl.
*H01L 29/06* (2006.01)
*H04L 29/06* (2006.01)

(52) U.S. Cl.
CPC ........ *H04L 65/4084* (2013.01); *H04L 65/605* (2013.01); *H04L 65/80* (2013.01)

(58) Field of Classification Search
CPC .................................................. H04L 65/4084
See application file for complete search history.

(56) References Cited

U.S. PATENT DOCUMENTS

| | | | |
|---|---|---|---|
| 9,503,355 | B2 | 11/2016 | Honda |
| 2007/0006255 | A1 | 1/2007 | Cain |
| 2008/0240230 | A1 | 10/2008 | Oxman |
| 2011/0131623 | A1 | 6/2011 | Kang et al. |
| 2013/0007816 | A1 | 1/2013 | Krikorian |

(Continued)

FOREIGN PATENT DOCUMENTS

| | | |
|---|---|---|
| CN | 102223576 A | 10/2011 |
| CN | 103493500 A | 1/2014 |
| CN | 104079978 A | 10/2014 |

OTHER PUBLICATIONS

Chinese Search Report corresponding to Application 2015100888633.

(Continued)

*Primary Examiner* — Suraj M Joshi
(74) *Attorney, Agent, or Firm* — Brinks Gilson & Lione

(57) ABSTRACT

Devices and methods for obtaining media stream with adaptive resolutions. The device includes a receiver in communication with a processor, and a transmitter. The receiver is configured to receive a plurality of media signals. The processor is programmed to communicate with a terminal device in the home network, obtain a corresponding display resolution of the terminal device, and select a media signal according to the corresponding display resolution of the terminal device and a video resolution of the media signal. The transmitter is configured to transmit media stream corresponding to the selected media signal to the terminal device.

18 Claims, 3 Drawing Sheets

(56) References Cited

U.S. PATENT DOCUMENTS

2013/0263202 A1* 10/2013 Bull ................ H04N 21/23406
          725/116
2014/0020034 A1* 1/2014 Manchester ..... H04N 21/23439
          725/86
2015/0016799 A1   1/2015 Park

OTHER PUBLICATIONS

Chinese Office Action for Application No. 2015100888633 including English Translation.

* cited by examiner

302. Establishing a communication connection with a first target terminal device via the home network 304. Receiving from the first target terminal device a first request to display an audio visual document 306: Obtaining an original version of a data stream of the audio visual document in response to the first request 308: Determining a first predetermined display requirement associated with the first target terminal device 310: Transforming the original version data stream into a first version of the audio visual document according to the display requirement 312: Sending the first version of the audio visual document to the first target terminal device via the home network 314: Establishing communication connections with a second target terminal device via the home network 316: Receiving from the second target terminal device a second request to simultaneously display the audio visual document with the first target terminal 318: Determining a second predetermined display requirement associated with the second target terminal device 320: Based on the display requirement, transforming the original version of the audio visual document into a second version of the audio visual document 322: Sending the second version of the audio visual document to the second target terminal device synchronously to the sending of the first version of the audio visual document to the first target terminal device

FIG. 3

DEVICES AND METHODS FOR TRANSMITTING ADAPTIVELY ADJUSTED DOCUMENTS

PRIORITY STATEMENT

This application is a continuation-in-part of U.S. patent application Ser. No. 14/562,280, filed on Dec. 5, 2014, in the United States Patent and Trademark Office, the disclosure of which is incorporated herein in its entirety by reference.

BACKGROUND

With wide spread of network technologies, many homes now have their own home network, in which several different kinds of terminal devices, such as smart TVs, tablets, smart phones, computers etc. are connected to a local network within the range of a private home. Each of these terminal devices may obtain media signals through the home network, and then display content from the media signals. Often times, the media signals are live video streams.

Currently, in live video programs (for example, a live TV broadcast), a program provider generally sends a video stream with only a single video resolution to a network device in a user's home. The network device may then transmit the video stream to one or more terminal devices in the home network to display the video stream.

SUMMARY

The present disclosure provides devices and methods for transmitting adaptively adjusted audio visual documents to efficiently use a bandwidth of a home network system.

According to an aspect of the present disclosure, an electronic device may include a storage medium storing a set of instructions for transmitting adaptively adjusted audio visual documents in a home network system; and a processor in communication with the storage medium. The processor may execute the set of instructions to, through the home network, establish a communication connection with a first target terminal device via the home network; receive from the first target terminal device a first request to display an audio visual document; obtain an original version of the audio visual document in response to the first request; determine a first predetermined display requirement associated with the first target terminal device; transform the original version into a first version of the audio visual document by adjusting a first property of the original audio visual document to conform with the first predetermined display requirement; and send the first version of the audio visual document to the first target terminal device via the home network.

According to another aspect of the present disclosure, a method for transmitting adaptively adjusted audio visual documents may comprise, through a home network, establishing, by an electronic device, a communication connection with a first target terminal device via the home network; receiving, by the electronic device from the first target terminal device, a first request to display an audio visual document; obtaining, by the electronic device, an original version of the audio visual document in response to the first request; determining, by the electronic device, a first predetermined display requirement associated with the first target terminal device; transforming, by the electronic device, the original version into a first version of the audio visual document by adjusting a first property of the original audio visual document to conform with the first predetermined display requirement; and sending, by the electronic device, the first version of the audio visual document to the first target terminal device via the home network.

BRIEF DESCRIPTION OF THE DRAWINGS

FIG. 3 is a block diagram illustrating a method for adaptively adjusting resolutions, frame rates, and bit rates of media streams according to example embodiments of the present disclosure; and

DETAILED DESCRIPTION OF THE DRAWINGS

In today's internet protocol (IP) based home video entertainment or communication environment, it is common for multiple types of different devices, such as Smart TVs, set-top boxes, tablets, or phones to connect to the same network and consume video stream content concurrently. These devices may consume the same video stream content concurrently, or consume different video stream content concurrently. These devices in the home network may have different screen sizes and other attributes. For example, the maximum resolutions of images or videos these devices display may be different. In current live video programs (for example, a live TV broadcast), a program provider generally sends a video stream with only a single video resolution to a network device in a user's home. Sending every device a video program of the same resolution causes waste of bandwidth resources, because some devices may only require or be able to process a video program of a lower resolution. This is especially true when multiple devices are accessing the program simultaneously. Sending video programs with unnecessarily high resolution and unnecessarily high frame rate to every one of the multiple devices may quickly drain the bandwidth of the home network. The present disclosure provides methods and devices to improve the technology of home network media signal transmission. By transcoding the media stream with adaptive resolutions and frame rate, and sending the transcoded media stream with adjusted bit rate, the disclosed methods and devices may reduce the bandwidth that a home network requires.

Figure 1:
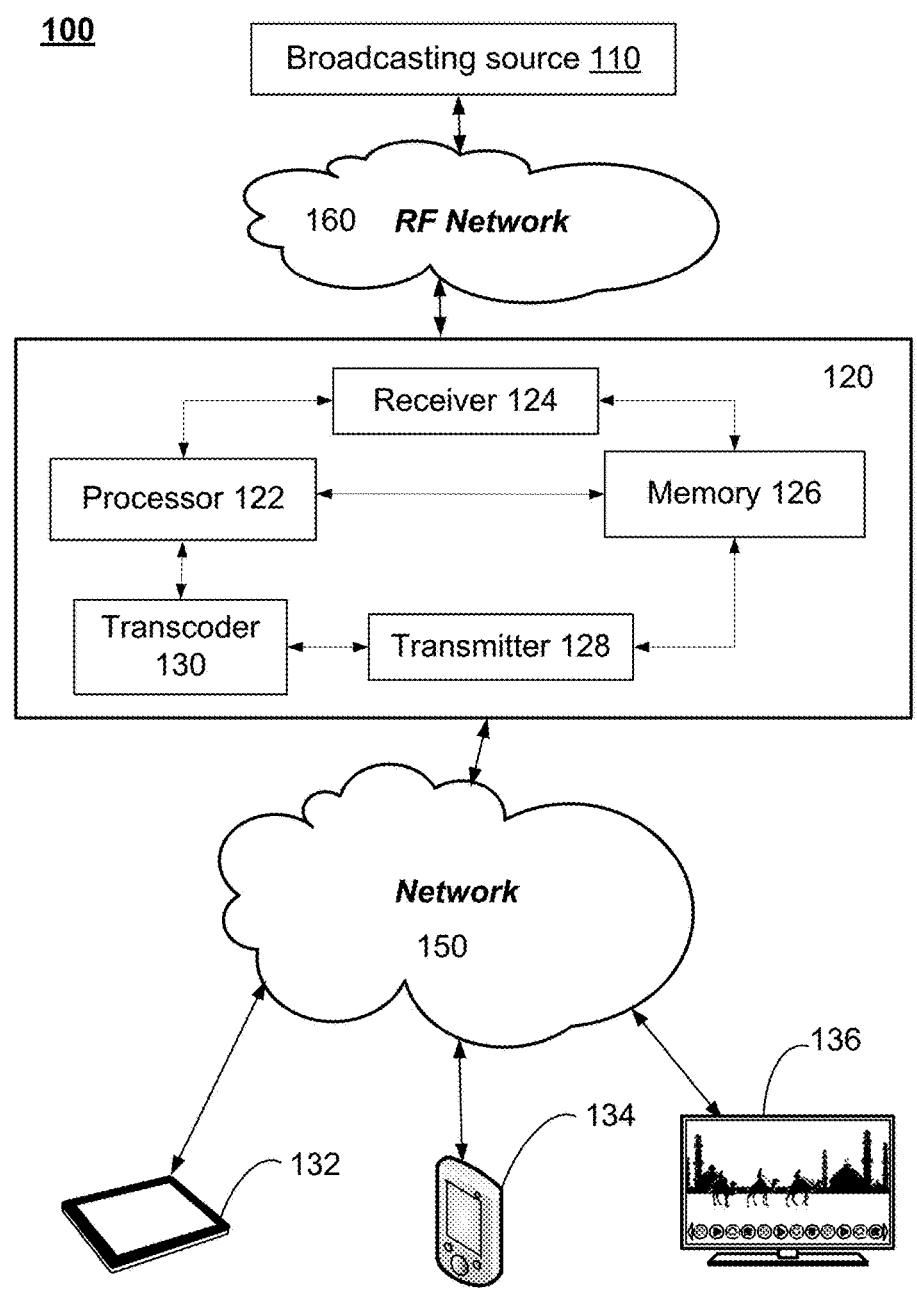
FIG. 1 is a block diagram of an example home network system for adaptively adjusting media stream resolutions, frame rate, and bit rate of media streams, according to example embodiments of the present disclosure.

Referring now to the drawing, FIG. 1 is a block diagram of an example home network system 100 for adaptively adjusting media stream resolutions, frame rate, and bit rate, according to example embodiments of the present disclosure. The example home network system 100 may include a controller 120 and a plurality of terminal devices 132, 134, 136. The home network system 100 may use a home network 150 for the communications between the controller 120 and the terminal devices 132, 134, 136.

The home network 150 may be a type of data communication network that facilitates communication and interoperability among digital devices present inside or within the close vicinity of a home or a building, such as an office building. For example, the home network 150 may be WiFi, a wide area network (WAN), or local area network (LAN). The home network 150 may rely on at least one of the following network devices to establish physical layer, data link layer, and network layer connectivity both internally amongst devices and externally with outside networks: a modem, a router, a network switch, or a wireless access point (not shown).

Accordingly, the controller 120 may be connected to the plurality of terminal devices 132, 134, and 136 via the home network. For example, the controller 120 may be connected to the terminal device 132, 134, 136 via the modem or the router. The terminal devices 132, 134, 136 may be any electronic device capable of receiving a media signal and/or document, such as an audio visual signal and/or document such as an image, a sound track, or a video stream and display the media signal. The terminal device 132, 134, 136 may be a television set, a LCD TV, a LED TV, a laptop, a desk top computer, a tablet computer, a smart phone, a media player, a smart watch, or any device including a video display unit.

The controller 120 may also be configured to be in communication with a remote broadcasting source 110. The broadcasting source 110 may be any type of commercially available audio visual program provider, such as a cable TV program provider, an Internet service provider, and/or a satellite TV program provider. The broadcasting source 110 may be connected to the home network 150 via a radio frequency (RF) network 160, a cable, an optical fiber, or any other wired or wireless communication channels. The controller 120 may communicate with the broadcasting source 110 via a network, such as the RF network 160. For example, the controller 120 may be connected to the modem through wired or wireless connection, or may be part of the modem or the router (not shown) and may be connected to the broadcasting source 110 via the modem or router. As a result, the controller 120 may receive media signals, including, for example, video program data, from the broadcasting source 110. The controller 120 also may receive media signals from a radio frequency signal source or a media signal source or a TV broadcaster.

The media signals may be images, video signals, audio signals, live video signals, or signals that have an audio visual component. For example, the media signals may include linear TV programs, and the linear TV programs may be from a TV broadcaster. The linear TV programs may include live sports, live news, or other live events from cable TV, satellite TV, or Internet Protocol television (IPTV). These kind of linear TV media signals are different from video on demand (VoD) services where the user may select, skip, fast forward, and rewind a video program. For example, the linear TV media signals may include live sports programs, live music events, live entertainment events, or any other live performances, which happens simultaneously when the TV media signals are generated and transmitted. Alternatively, the media signal may also include non-live audio visual signals, such as video streams from the Internet or video streams from other video program providers such as NETFLIX™. The media signal may be of a fixed resolution. For example, the broadcasting source 110 may send a live TV program to the controller at a predetermined resolution regardless of the resolution requirements of the terminal device 132, 134, 136 in the home network system 100.

The controller 120 may include hardware circuits and/or components such as a processor 122, a receiver 124, a memory 126, a transmitter 128, and a transcoder 130. The processor 122 may be in communication with the receiver 124. The receiver 124 may be configured to receive the media signals from the broadcasting source 110. The receiver 124 may include a television tuner configured to receive video signals (live or non-live) from a radio frequency signal source, which may include cable TV signal source, Direct Broadcast Satellite signal source, IPTV signal source, or other types of audio/visual signal such as images or videos from Internet. The media signals may be encoded by the broadcasting source 110. As raw data from the broadcasting source 110, the media signal (e.g., a video stream) may be of a preset definition, bit rate, frame rate and/or format depending on the service package of the home network system 100. For example, the video signals may be a 1080P full HD video signal, e.g., the video signal may have a resolution of 1920×1080 pixels and a 30 FPS (Frame per second) frame rate, and a speed of the video transmission may be 40 M bits per second. Further, the receiver 124 may include hardware modules configured to decode the received media signals. The hardware modules may include a decoder module or a plurality of decoder modules. The decoder module may have different working settings to decode different types of media signals.

The controller 120 may also include the transcoder 130. The transcoder 130 may be implemented in any suitable combination of hardware and software, including as a set of instruction stored in the non-transitory storage medium of the memory 126 and may be executed by the processor. Alternatively, the transcoder 130 may be a hardware module and/or circuit built in the controller 120. The transcoder 130 may be a separate hardware module that is separated from the receiver 124. Alternatively, the transcoder 130 may be integrated with the receiver 124. The transcoder 130 may be configured to transform a media signal of a first resolution into a media signal of a second resolution. It may also or instead be configured to transform the media signal from a first format to a different second format. For example, when a video stream is received by the receiver 124 from the broadcasting source 110 and is decoded by the decoder, the transcoder may further transform the video stream to a video stream of a different definition and format to match a display requirement of particular application installed in a terminal device 132, 134, 136.

The controller 120 may further include the transmitter 128 configured to send media signals to at least one of the connected terminal devices 132, 134, and 136. The transmitter 128 may be a separate hardware module that is separated from the receiver 124. Alternatively, the transmitter 128 may be integrated with the receiver 124. The transmitter may be configured to send a media signal at a defined bit rate under the direction of the processor 122. The transmitter 128 may have different working frequencies for different terminal devices. The transmitter 128 may have different output power levels when transmitting media signals to different terminal devices. The output power may be determined by the processor 122 to meet the bandwidth requirements of different video signals. For example, the output power may be very high for transmitting 4K high definition (HD) video signals to a smart TV while the output power may be relatively low for transmitting standard resolution video signals to a media player. Further, the output power may be affected by the physical distance between the terminal device 132 and the controller 120. Thus, the output power may need to be increased for transmitting HD video signals to terminal devices located at a peripheral region of the home network.

The controller may also include the processor 122 in communication with the receiver 124, the transcoder 130, and the transmitter 128. The processor 122 may also be configured to implement at least part of the decoding and transcoding computation. The processor 122 may be programmed to communicate with each of the terminal devices 132, 134, 136 in the home network system 100 and obtain device profile thereof. For example, in a home network environment, the processor 122 may be programmed to communicate with a terminal device 132 in the home network. When the terminal device 132 is connected to the controller 120 for the first time, the processer 122 may be programmed to obtain corresponding information, such as identification, model, brand of the terminal device, and corresponding display resolution, bit rate, and frame rate requirements of the terminal device 132. The display resolution of the terminal device 132 may be a native display resolution of the terminal device 132 or other display resolution. The processer 122 may obtain the corresponding display resolution directly from the terminal device 132. Or, a user may pre-define the display resolution of the terminal device 132. For each terminal device 132, 134, 136, the processor may collect all necessary information of the terminal device and create a device profile therefor, so that each time when the terminal device connects to the home network 150 and requests a media signal from the controller 120, the processor 122 may access the device profile of the terminal device and determine whether the media signal needs to be transcoded or otherwise transformed accordingly. Since a terminal device may not frequently change its configuration, the profile of the terminal device may be persistent for the terminal device when the terminal device stays in the home network.

For example, when the terminal device 132 first connects to the controller 120, the controller 120 may collect information of the terminal device 132 and create a device profile for the terminal device 231. Later, when a user of the terminal device determines to watch a TV program, the terminal device 132 may send a request to the controller 120 for a corresponding video signal. The controller 120 may transmit the request to the broadcasting source 110, which corresponds by sending the requested video signal back. The decoder subsequently may decode the received video signal. Either before, after, or at the same time of the decoding, the processor 122 may access the device profile of the terminal device 132 and check if further data processing of the decoded video signal is needed in order for the terminal device 132 to properly display the video signal. If the terminal device 132 is using a video playing application to display the video signal, which requires a document format different from the decoded video signal, the processor 122 may instruct the decoder to transform the decoded video signal into the required format. Further, if the terminal device 132 requires a different resolution and/or frame rate from the decoded video signal, the processor 122 may direct the transcoder 130 to transform the decoded video signal into a video signal that meets the requirements of the terminal device 132. The processed video signal that is eventually sent to the terminal device 132 is a target video signal.

To meet the resolution requirement of the terminal device 132, the transcoder 130 may add or remove some pixels of each frame of the video signal. For example, the resolution of the decoded video signal may be 1920×1080 but the highest resolution that the terminal device 132 can display may be 1280×700. Before sending the video signal to the terminal device 132, the processor 122 may direct the transcoder 130 to reduce the resolution of the decoded video signal to be equal to or lower than the maximum resolution of the terminal device 132.

In an example embodiment, the processor 122 may first determine a ratio between the corresponding horizontal resolution and vertical resolution of the required video signal and the decoded video signal, i.e., the processor 122 may determine that the horizontal resolution ratio is 1280/1920=0.667; and the vertical resolution ratio is 700/1080=0.648. The processor 122 then may select the smaller ratio between the horizontal resolution ratio and the vertical resolution ratio as a target ratio to transcode the decoded video signal. Here, because the vertical resolution ratio 0.648 is less than the horizontal resolution ratio 0.667, the processor may select the vertical resolution ratio as the target ratio. The processor 122 then may direct the transcoder 130 to transform the decoded video into a target video with a resolution 0.648 times the resolution of the decoded video.

The transcoder 130 may use various methods to reduce the resolution of the decoded video signal. For example, the transcoder 130 may reduce the resolution of the decoded video signal by resizing each frame of image of the decoded video to 64.8% of its original size. Alternatively, the transcoder 130 may adjust the resolution of the decoded video simply by matching the required horizontal resolution and vertical resolution. For example, the transcoder 130 may resize each frame image of the decoded video signal, which is 1920×1080 pixels, to a frame image of 1280×700 pixels. Images in the target video signal, accordingly, may not be proportional to the decoded video signal.

To meet the frame rate requirement of the terminal device 132, the transcoder 130 may add or remove some frames in the video signal. For example, the frame rate of the decoded video signal may be 30 FPS but the frame rate that the terminal device 132 can display may be 24 FPS. Thus before sending the video signal to the terminal device 132, the processor 122 may direct the transcoder 130 to reduce the frame rate of the decoded video signal to be equal to or lower than the maximum frame rate 24 FPS of the terminal device 132. The transcoder 130 may use various methods to reduce the frame rate of the decoded video signal. For example, the transcoder 130 may evenly remove one (1) frame of image from every five (5) frames of the decoded video signal, so that instead of displaying 30 frames per second, the target video only display 24 frames per second after the transcoding. If the frame rate that the terminal device 132 can display is 60 FPS, higher than the frame rate of the decoded video signal, before sending the video signal to the terminal device 132, the processor 122 may direct the transcoder 130 to increase the frame rate of the decoded video signal to be equal to or lower than the maximum frame rate 24 FPS of the terminal device 132. The transcoder 130 may use various methods to increase the frame rate of the decoded video signal. For example, the transcoder 130 may repeat the frames pro rata in the target signal to match the required frame rate. For example, the transcoder may repeat one (1) frame of image for every frame of the decoded video signal, so that instead of displaying 30 frames per second, the target video displays 60 frames after the transcoding.

The transcoder 130 may also modify the format of the media signal to a format required by the terminal device 132. For example, depending on the requirement of the terminal device 132, the transcoder 130 may modify and/or transform a tagged image file format or .TIFF image to a joint photographic experts group or .JEPG format. The transcoder 130 may also transcode video streams. For example, H.265 is a popular and efficient codec that supports both standard definition (SD) and high definition (HD). Thus it is generally more efficient for the home network system to transcode a video into H.265 format as long as a terminal device supports H.265 decoding. Accordingly, the transcoder 130 may modify and/or transform a MPEG-2/H.264 format SD or HD video into a UHD video of H.265/4K standard or vise versa.

By adjusting the resolution and frame rate of the target video signal, the controller may be able to send the terminal device 132 just what is needed, i.e., the target video signal is accurately tuned to just meet the audio visual quality requirement for the user to enjoy the video TV program on the terminal device 132. Thus the target video signal takes a minimum amount of bandwidth of the home network system.

Additionally, to avoid unnecessary bandwidth waste, the processor 122 may also check the device profile of the terminal device 132, 134, 136 to determine a suitable bit rate necessary for transmitting the target video signal. The processor 122 may determine a bit rate of the media signal transmitted from the broadcasting source 110. Based on this bit rate as well as the frame rate and resolution required by the terminal device 132, 134, 136, the processor 122 may determine a target bit rate suitable therefor. The processor 122 may then direct the transcoder 130 to transcode the media signal to the target bit rate. For example, if the broadcasting source 110 sends the media signal at 40 M bits per second, after transcoding, the processor may determine that the target bit rate of terminal device 132 is 5 M bits per second. Accordingly, the processor 122 may direct the transcoder 130 to transcode the media signal to 5 M bits per second and send the target media signal at the target bit rate 5 M bits per second.

By transmitting the target media signal at a required bit rate to the terminal device 132, 134, 136, the home network system 100 may further reduce the bandwidth that the terminal device 132, 134, 136 takes when displaying the TV program.

In addition to the transcoder 130, the controller may also include a memory 126 accessible by the processor 122. The memory 126 may include both transitory storage medium and non-transitory storage medium. The non-transitory storage medium may be configured to store the device profiles of the terminal devices 132, 134, 136 in the home network system. Additionally, the non-transitory storage medium may also store sets of instructions for the processor 122 to execute. By executing the sets of instructions the processor may direct the decoder, the transcoder 130, and the transmitter to decode the media signal, transcode the media signal to the target media signal, and transmit the target signal to the terminal device 132, 134, 136.

Figure 2:
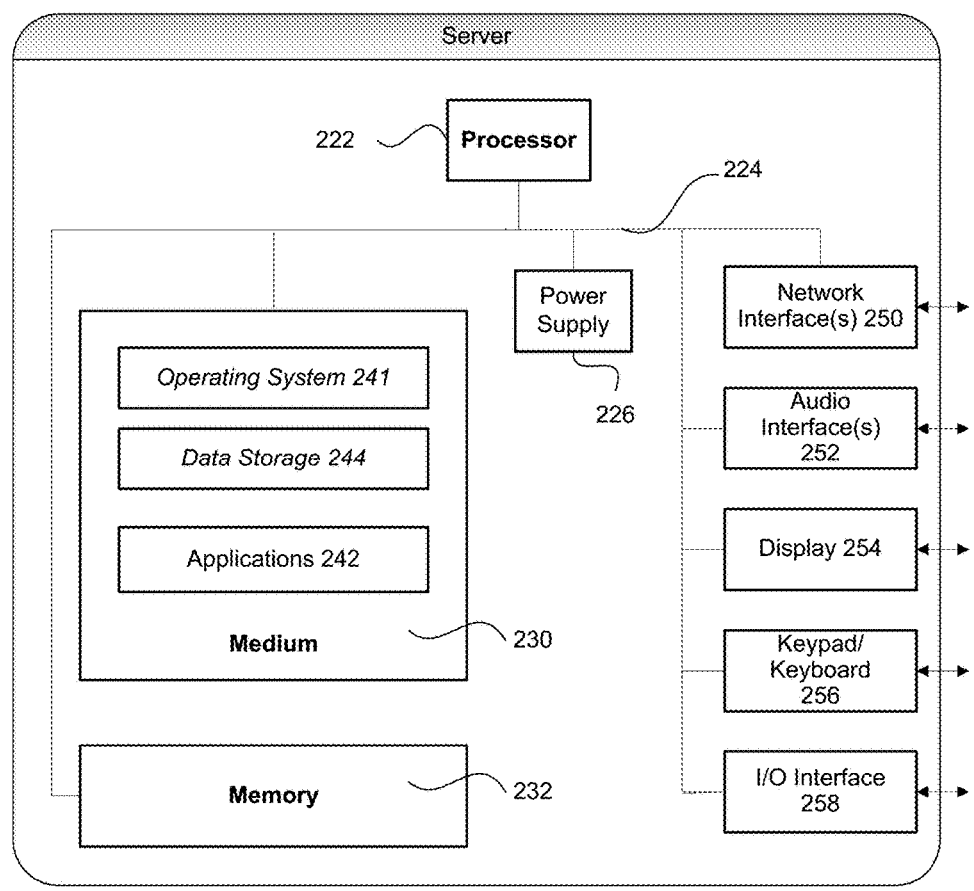
FIG. 2 illustrates a server system that serves as a controller.

The controller 120 in FIG. 1 may be a specially designed electronic device for providing terminal devices 132, 134, 136 with media signals with adaptive resolutions, frame rates, and bit rates. A general computer server system may also be used to serve as the controller 120. FIG. 2 illustrates a general server system 200 that may also serve as the controller 120. The server 200 may include different hardware configurations or capabilities. For example, a server 200 may include one or more central processors 222, memory 232 that is accessible to the one or more processors 222, one or more medium 230 (such as one or more mass storage devices) that store application programs 242 or data 244, one or more power supplies 226, one or more wired or wireless network interfaces 250, one or more input/output interfaces 258. The memory 232 may include non-transitory storage memory and transitory storage memory.

The server 200 may also include one or more operating systems 241, such as Windows Server, Mac OS X, Unix, Linux, FreeBSD, or the like. Thus, the server 200 may include, as examples, dedicated rack-mounted servers, desktop computers, laptop computers, set top boxes, integrated devices combining various features, such as two or more features of the foregoing devices, or the like. Additionally, the server 200 may include a BUS 224, an audio interface 252 such as a speaker, a display 254 such as a screen, and an I/O interface 256 such as an I/O interface to connect the server 200 to an external device.

The server 200 may be implemented in the home network system 100 to serve as the controller 120. To this end, the server may store a set of instructions in the medium 330 for adoptively adjusting resolution, frame rate, and bit rate of a media signal in a way similar to the controller 120 as introduced above. The processor 222 may execute the set of instructions to decode and transcode the media signal received from the broadcasting source 110 into the target media signal, and then may send the target media signal to a target terminal device 132, 134, 136.

FIG. 3 is a block diagram illustrating a method for adaptively adjusting resolutions, frame rates, and bit rates of media streams according to example embodiments of the present disclosure. The method may be implemented as a set of instructions stored in a storage medium of the controller 120 or the server system 200 and may be executed by the processor thereof. Merely for a purpose of illustration, FIG. 3 takes the controller 120 as an example for executing operations in the method.

Initially, at block 302, the method includes establishing a communication connection with a first target terminal device via the home network. For example, the controller 120 may establish a wireless communication with the terminal device 132 via the home network in FIG. 1. The wireless communication may be over a standardized interface such as WiFi of 802.11, Bluetooth or similar. In some applications, the communication connection may be over a wireline connection. Any suitable signal communication method may be used.

At block 304, the method includes receiving from the first target terminal device a first request to display an audio visual document. For example, when a user of the terminal device 132 (i.e., the first terminal device) wish to watch an online TV program, the user may operate the terminal device 132 to send a request (i.e., the first request) to display the online TV program, which is subsequently received by the controller 120 via the home network.

At block 306, the method includes obtaining an original version of the audio visual document in response to the first request. After receiving the request form the terminal device 132, the controller 120 may respond by transmitting the request to a source of the audio visual document and receive the audio visual document in an original version. For example, the audio visual document may be 1080P full HD video signals, e.g., the audio visual document may have a resolution of 1920×1080 resolution and a 30 FPS frame rate, and a speed of the video transmission may be 40 M bits per second. The source of the audio visual document may be an external source outside the home network, such as an online TV program provider, or a local storage medium (e.g., a CD ROM, a hard disk etc.) that saves the online TV program. The audio visual document may be obtained in a form of data stream, i.e., the controller 120 may start to further process the original version of the received portion of the audio visual document before receiving the complete document.

At block 308, the method includes determining a first predetermined display requirement associated with the first target terminal device.

Either before receiving the audio visual document or upon receiving the audio visual document, the controller 120 may access the device profile of the terminal device 132 saved in the memory 126 and obtain display requirements that the terminal device 132 needs. The display requirements may include requirements such as a predetermined resolution requirement, frame rate requirement, bit rate requirement, and/or format requirement that are predetermined when the device profile was created by the controller 120. For example, the terminal device 132 may be a smart phone. When the terminal device 132 first connects to the controller 120 via the home network, the controller 120 may collect system configurations of the terminal device and determine that, by default the terminal device 132 may have a screen at a resolution of 1136×640, display a video at 30 frames per second. When the terminal device 132 plays an audio visual document, it may by default requires 128 K bits per second for a sound track and 1 M bits per second for a video stream. Further, the controller 120 may determine that the terminal device may only play audio visual documents of predetermined data encoding formats, such as .JPG for photos and/or MPEG-2/H.264 standard for high definition (HD) videos. Accordingly, the controller 120 may create the device profile for the terminal device 132 recording the above configuration as the display requirement of the terminal device 132. Alternatively, the display requirement may also be predetermined manually by an administrator of the home network system 100.

310: Transforming the original version data stream into a first version of the audio visual document according to the display requirement. When the display requirement of the terminal device 132 does not completely conform to the configuration of the original version audio visual document, the controller 120 may adjust and/or modify the mismatched portion and/or property of the original version audio visual document accordingly. For example, based on the device profile, the controller 120 may determine that the terminal device 132 requires a same frame rate as the original audio visual document, and the format of the original version audio visual document is compatible with the format requirement of the terminal device 132, but the terminal device 132 does not require an equally high resolution and a bit rate to properly display the audio visual document. Therefore, the controller 120 may modify and/or adjust the original version audio visual document in accordance with the display requirement as set forth in conjunction with FIG. 1, so that the modified and/or transformed version, i.e., the first version, of the audio visual document meets the display requirement, no more and no less. Further, the transformation may be conducted in real-time or near real-time with respect to the receipt of the original data stream. By real time or near real time, it is meant that the transformation is achieved without delay or degradation in the viewing experience of a viewer viewing the audio visual document.

At block 312, the method includes sending the first version of the audio visual document to the first target terminal device via the home network. After the modification and/or adjustment to the audio visual document, the controller 120 may send the first version of the audio visual document to the terminal device 132. The first version of the audio visual document may be transmitted to the first target terminal device in a form of data stream. For example, the controller 120 may real-time transform the original version data stream received from the broadcasting source into a first version data stream, wherein the first version data stream corresponding to the first version of the audio visual document. The controller 120 may then real-time transmit the first version data stream to the first terminal device 132 for display.

As set forth above, the method in FIG. 3 provides a method that enables an electronic device, such as the controller 120 and/or a computer server system 200 to modify properties of a raw audio visual document according to a display requirement of a target terminal device. As result, the controller 120 may use lesser bandwidth of the home network to fulfill the request of the terminal device 132.

In an embodiment, the electronic device may communicate with a plurality of terminal devices, such as the terminal devices 132, 134, 136. For each of the plurality of terminal devices, the electronic device may be able to independently provide the above-stated document transformation and/or modification for a requested audio visual document. The audio visual documents from the plurality of terminal devices may be the same or may be different.

For example, in the home network system 100, the user of terminal device 132 may wish to watch a live sports program and may send an appropriate request to the controller 120. The controller may receive the original version of the live sports program from the broadcasting source 110, transform the original version to the first version according to the display requirement of the terminal device 132, and then send the first version to the terminal device 132. At the same time, other users of terminal devices 134 and 136 may also wish to watch the live sports program. The method in FIG. 3 may enable the controller 120, or the computer server system 200, for example, to provide the live sports program to the terminal devices 134, 136 simultaneously and/or concurrently. To this end, the controller 120 may perform the following operations:

314: Establishing communication connections with a second target terminal device via the home network. The second target terminal device may be the terminal device 134 or 136 or both, and may be TV, a mobile terminal device, and/or a tablet computer.

316: Receiving from the second target terminal device a second request to simultaneously and/or concurrently display the audio visual document with the first target terminal. Merely for purposes of illustration, the following introduction takes only one terminal device 134 as an example. When more than one target terminal device send requests to simultaneously and/or concurrently display the audio visual document, the controller may respond to the request individually.

318: Determining a second predetermined display requirement associated with the second target terminal device. Similar to the device profile of the first target terminal device, the controller 120 may create a device profile of the second target terminal device. The device profile of the second terminal device may include configurations of the second target terminal device, such as a resolution requirement, a frame rate requirement, a bit rate requirement, and a format requirement. The controller 120 may access the device profile for the second target terminal device, such as the terminal device 134 and/or 136 in this example, and obtain these display requirements.

320: based on the display requirement, transforming the original version of the audio visual document into a second version of the audio visual document by adjusting a property of the original audio visual document to conform to the second predetermined display requirement. To this end, the controller 120 may compare the original version of the audio visual document and the display requirement of the terminal device 134 (i.e., the second target terminal device), when the display requirement of the terminal device 134 does not completely conform to the configuration of the original version audio visual document, the controller 120 may adjust and/or modify the mismatched portion and/or property of the original version audio visual document accordingly in a similar manner as procedure 310. Further, similar to procedure 310, the transformation may be conducted in real-time with respect to the receipt of the original data stream of the audio visual document, so that the transformation to the second version of the audio visual document is synchronized with the transformation to the first version of the audio visual document.

At block 322, the method includes sending the second version of the audio visual document to the second target terminal device synchronously to the sending of the first version of the audio visual document to the first target terminal device. As a result, the first version and second version of the audio visual document are displayed synchronously on the first target terminal device and the second target terminal device.

The above example embodiment describes the scenario where the second target terminal device requests to display a same audio visual document as the request of the first target terminal device. In the event that the second target terminal device requests to display a different audio visual document, such as a second audio visual document, the controller may first request and receive an original version of the second audio visual document, then conduct a transformation and/or modification to the original version of the second audio visual document if its configuration does not match the display requirement of the second target terminal device.

As set forth above, by modifying an original version of an audio visual document to a version individualized to the target terminal device, the methods and electronic devices in the present disclosure may reduce the data size for delivering the audio visual document, thereby taking advantage of a bandwidth in a home network system more efficiently. More efficient use of bandwidth in the home network system, in turn, allows increased capacity of data transmission so that communication network resources may be more fully and efficiently used.

While example embodiments of the present disclosure relate to devices and methods for transmitting adaptively adjusted audio visual documents, the devices and methods may also be applied to other Applications. For example, in addition to audio visual documents, the methods and apparatus may also be applied to any other types of documents to effectively distribute the bandwidth usage of a home network system. The present disclosure intends to cover the broadest scope of systems and methods for transmitting adaptively adjusted documents.

Further, throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. section 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. The term "user" is used to describe one or more operators of a device. The "user" may include a human user or a machine that operates or uses the device.

Thus, example embodiments illustrated in FIGS. 1-3 serve only as examples to illustrate several ways of implementation of the present disclosure. They should not be construed as to limit the spirit and scope of the example embodiments of the present disclosure. It should be noted that those skilled in the art may still make various modifications or variations without departing from the spirit and scope of the example embodiments. Such modifications and variations shall fall within the protection scope of the example embodiments, as defined in attached claims.

What is claimed is:

1. An electronic device, comprising:
   a memory comprising a set of instructions for transmitting adaptively adjusted visual content in a home network system; and
   a processor in communication with the memory, wherein when executing the set of instructions, the processor is directed to, through a home network:
   establish a communication connection with a first target terminal device via the home network;
   receive from the first target terminal device a first request to display a visual content;
   obtain an original version of the visual content in response to the first request;
   obtain an original vertical pixel resolution and an original horizontal pixel resolution of the original version of the visual content;
   determine a first predetermined display requirement associated with the first target terminal device from a first pre-established device profile for the first target terminal device persistently maintained in the electronic device, wherein the first predetermined display requirement comprises a vertical pixel resolution and horizontal pixel resolution of the first target terminal device;

obtain a first ratio between the vertical pixel resolution and the original vertical pixel resolution;

obtain a second ratio between the horizontal pixel resolution and the original horizontal pixel resolution;

transform the original version of the visual content into a first version of the visual content to conform with the first predetermined display requirement based on at least smaller of the first ratio and the second ratio; and send the first version of the visual content to the first target terminal device via the home network.

2. The electronic device of claim 1, wherein the first pre-established device profile maintained in the electronic device is registered with the electronic device when the first target terminal device is connected to the electronic device for a first time.

3. The electronic device of claim 1, wherein the first predetermined display requirement further comprises a predetermined frame rate requirement, and the processor, when executing the set of instructions, is configured to transform the original version of the visual content into the first version of the visual content further based on the predetermined frame rate requirement.

4. The electronic device of claim 1, wherein the first predetermined display requirement further comprises a predetermined bit rate requirement, and the processor, when executing the set of instructions, is configured to transform the original version of the visual content into the first version of the visual content further based on the predetermined bit rate requirement.

5. The electronic device of claim 1, wherein the processor is further directed to:

establish a communication connection with a second target terminal device via the home network;

receive from the second target terminal device a second request to concurrently display the visual content with the first target terminal device;

determine a second predetermined display requirement associated with the second target terminal device from a second pre-established device profile for the second target terminal device persistently maintained in the electronic device;

transform the original version of the visual content into a second version of the visual content by adjusting the original version of the visual content to conform with the second predetermined display requirement; and send the second version of the visual content to the second target terminal device synchronously to sending the first version of the visual content to the first target terminal device.

6. The electronic device of claim 5, wherein the second target terminal device comprises at least one of a television, a mobile terminal device, and a tablet computer.

7. The electronic device of claim 5, wherein the second predetermined display requirement comprises a predetermined resolution requirement associated with the second target terminal device.

8. The electronic device of claim 5, wherein the second predetermined display requirement comprises a predetermined frame rate requirement associated with the second target terminal device.

9. The electronic device of claim 5, wherein the second predetermined display requirement comprises a predetermined bit rate requirement associated with the second target terminal device.

10. A method for transmitting adaptively adjusted visual content, the method comprising, through a home network:

establishing, by an electronic device, a communication connection with a first target terminal device via the home network;

receiving from the first target terminal device a first request to display an visual content;

obtaining, by the electronic device, an original version of the visual content in response to the first request;

obtaining, by the electronic device, an original vertical pixel resolution and an original horizontal pixel resolution of the original version of the visual content;

determining, by the electronic device, a first predetermined display requirement associated with the first target terminal device from a first pre-established device profile associated with the first target terminal device persistently maintained in the electronic device, wherein the first predetermined display requirement comprises a vertical pixel resolution and horizontal pixel resolution of the first target terminal device;

obtaining a first ratio between the vertical pixel resolution and the original vertical pixel resolution;

obtaining a second ratio between the horizontal pixel resolution and the original horizontal pixel resolution;

transforming, by the electronic device, the original version of the visual content into a first version of the visual content to conform with the first predetermined display requirement based on at least smaller of the first ratio and the second ratio; and sending, by the electronic device, the first version of the visual content to the first target terminal device via the home network.

11. The method of claim 10, wherein the first pre-established device profile maintained in the electronic device is registered with the electronic device when the first target terminal device is connected to the electronic device for a first time.

12. The method of claim 10, wherein the first predetermined display requirement further comprises a predetermined frame rate requirement.

13. The method of claim 10, wherein the first predetermined display requirement further comprises a predetermined bit rate requirement.

14. The method of claim 10, further comprising:

establishing, by an electronic device, a communication connection with a second target terminal device via the home network;

receiving, by the electronic device from the second target terminal device, a second request to and/or concurrently display the visual content with the first target terminal device;

determining, by the electronic device, a second predetermined display requirement associated with the second target terminal device from a second pre-established device profile for the second target terminal device persistently maintained in the electronic device;

transforming, by the electronic device, the original version of the visual content into a second version of the visual content to conform with the second predetermined display requirement; and sending, by the electronic device, the second version of the visual content to the second target terminal device synchronously to the sending of the first version of the visual content to the first target terminal device.

15. The method of claim 14, wherein the second target terminal device comprises at least one of a TV, a mobile terminal device, and a tablet computer.

16. The method of claim 14, wherein the second predetermined display requirement comprises a predetermined resolution requirement.

17. The method of claim 14, wherein the second predetermined display requirement comprises a predetermined frame rate requirement.

18. The method of claim 14, wherein the second predetermined display requirement comprises a predetermined bit rate requirement.

* * * * *